July 13, 1954 W. C. NORRIS ET AL 2,683,869

AUTOMATIC COMMUNICATION SYSTEM

Filed Sept. 21, 1945 2 Sheets-Sheet 1

Inventor
WILLIAM C. NORRIS
ROBERT E. MILLER

By Ralph L. Chappell

Attorney

July 13, 1954 W. C. NORRIS ET AL 2,683,869

AUTOMATIC COMMUNICATION SYSTEM

Filed Sept. 21, 1945 2 Sheets-Sheet 2

Inventor
WILLIAM C. NORRIS
ROBERT E. MILLER

By Ralph L Chappell

Attorney

Patented July 13, 1954

2,683,869

UNITED STATES PATENT OFFICE 2,683,869

AUTOMATIC COMMUNICATION SYSTEM

William C. Norris and Robert E. Miller,
United States Navy

Application September 21, 1945, Serial No. 617,909

2 Claims. (Cl. 340—171)

(Granted under Title 35, U. S. Code (1952), sec. 266)

This invention relates to an automatic communication system, and particularly a system in which pulses are used for signalling.

One object of the invention is to provide a means for the automatic reception, frequency indication, and recording of any type pulse transmission on any frequency within a wide radio frequency band.

Another object is to provide any desired degree of selectivity for integral parts of the frequency band covered through channelization of amplifiers in the receiver.

Another object is to provide a method of receiving extremely short messages without resorting to frequency scanning techniques.

A further object is to provide wide band coverage with negligible sacrifice in receiver sensitivity.

A still further object is to continuously and automatically monitor without the attention of an operator, a comparatively wide band used as a distress calling frequency.

Other objects will become apparent from the following specification in conjunction with the appended claims.

With this receiving system a mobile transmitter may be equipped with a small electronic pulse generator which by selective pulse combinations is arranged to send a distress message at a very high rate of speed. In the event of an emergency, the pulse combination indicating the identity and origin of the mobile transmitter may be set up in a matter of seconds. The transmitter would then be turned on without regard to accurate frequency setting and would thereafter continuously repeat the message without attention by the operator. The device to be described would automatically receive and record the message without attention and indicate the frequency upon which it occurred, and it may be used to automatically tune an auxiliary conventional narrow band receiver to the proper frequency for the purpose of taking direction finder bearings. This mode of operation is given by way of example only, and it is not intended to restrict the use of the equipment, which will be found capable of many other uses.

The invention may be more easily understood by the following description in connection with the accompanying drawings in which.

Figure 1:
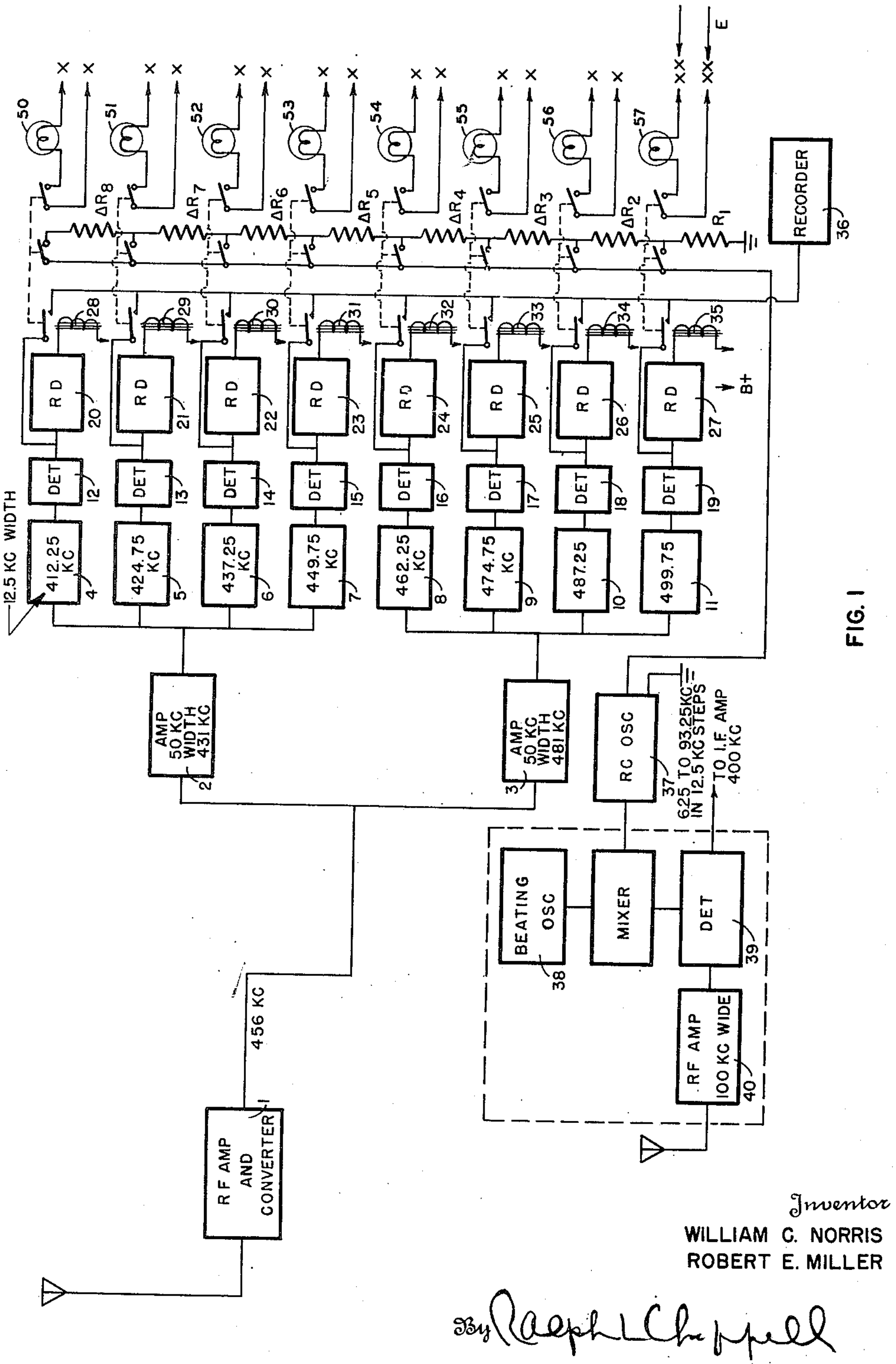
Figure 1 is a block diagram of the system as a whole.

Referring now to Figure 1, the system as a whole is divided into three principal parts, which are:

(1) Wide band reception channel
(2) Recognition device
(3) Recording equipment

Figure 2:
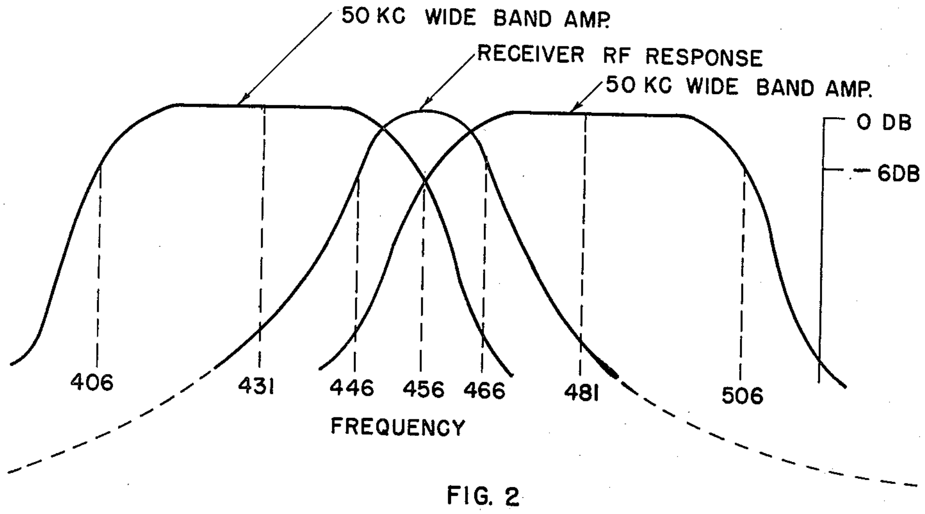
Figure 2 shows the frequency characteristics of the radio and intermediate frequency amplifiers.

The wide band receiving equipment consists of any conventional superheterodyne receiver 1 followed by an adaptor consisting of a special wide band amplifier 2—3, and narrow band channeling equipment 4—11. This adaptor unit operates on the output of the first detector or mixer and does not use the intermediate frequency stages, second detector, and audio portion of the receiver. To increase the effective band width of the converter in the receiver used, two intermediate frequency amplifiers, 2 and 3, each having a band width of 50 kilocycles, are tuned to either side of the receiver's radio frequency response characteristic as shown in Figure 2. These 50 kilocycle amplifiers are so tuned that the response characteristics of the wide band amplifiers complements that of the radio frequency portion of the radio receiver. Thus, while reception by the radio frequency portion of the radio receiver 1 is a maximum at the point of resonance of its tuned circuits, the output on both sides of the point of resonance drops off but is detectable over a considerable portion of the frequency spectrum, as shown in the dotted lines in Fig. 2. If, then, the amplifiers 2 and 3 are tuned to produce maximum outputs at frequencies in the portions of their band widths remote from the maximum resonance point of radio receiver 1, amplification of the signal from the receiver 1 will be large when said signal is small, and small when said signal is large so that amplifiers 2 and 3 complement the receiver 1. This results in the elevation of the skirts of the receiver response characteristic to provide a substantially flat response over the 100 kilocycle band obtained from the output of the two 50 kilocycle amplifiers. The output of each 50 kilocycle amplifier is channelized into four narrow band intermediate frequency amplifiers 4—11, each having a band width of 12.5 kilocycles. Each narrow band amplifier is tuned so that the mid-point of each of the resonant curves are separated by 12.5 kilocycles. The intersection of response curves for the narrow band channels occurs at the halfvoltage points thus the eight narrow band channels are separated throughout the 100 kilocycle band in a manner to provide continuous frequency coverage. This requires only that the device to be operated by the equipment be capable of accepting a 6 decibel level change in the desired signal. Each narrow band channel consists of two stages of conventional intermediate frequency amplification followed by individual detectors 12—19, connected to produce the desired polarity output voltage. Each detector feeds a separate recognition device 20—27. The particular narrow band channel width chosen and the number of channels used can, of course, be varied to suit various requirements.

The purpose of the recognition device is, as the name implies, to provide a means for recognizing the particular type of pulse transmission the equipment is intended to receive. In addition it serves to determine the particular radio frequency channel upon which the signal has been received and to connect the proper receiving channel to the recording equipment. The operation of the recognition device can serve the additional purpose of operating other devices as desired; such as counters, tabulators, and indicating lights 50 through 57, which indicate that reception is being had in a particular frequency band so that the operator may check operation of the recorder 36 and of the output from receiver 38—40 as hereinafter explained. The output relay closure of the recognition devices 28 through 35 may also be used to connect the proper value of resistance $R_1$ through $R_8$ into a circuit which will tune oscillator 37 to a predetermined frequency corresponding to that represented by the narrow band channel feeding the recognition device. When this oscillator is heterodyned against the high frequency oscillator 38 of an auxiliary superheterodyne receiver 38—40, this receiver would thereby be almost instantly tuned to the frequency upon which the transmission is taking place in response to operation of the recognition device. The input of the amplifier 40 has an acceptance band of 100 kilocycles at the signal frequency, but after conversion in mixer 39 it is applied to a conventional intermediate frequency amplifier. This receiver may be the receiver of a direction finder equipment, or may be used for any other purpose as desired.

Figure 3:
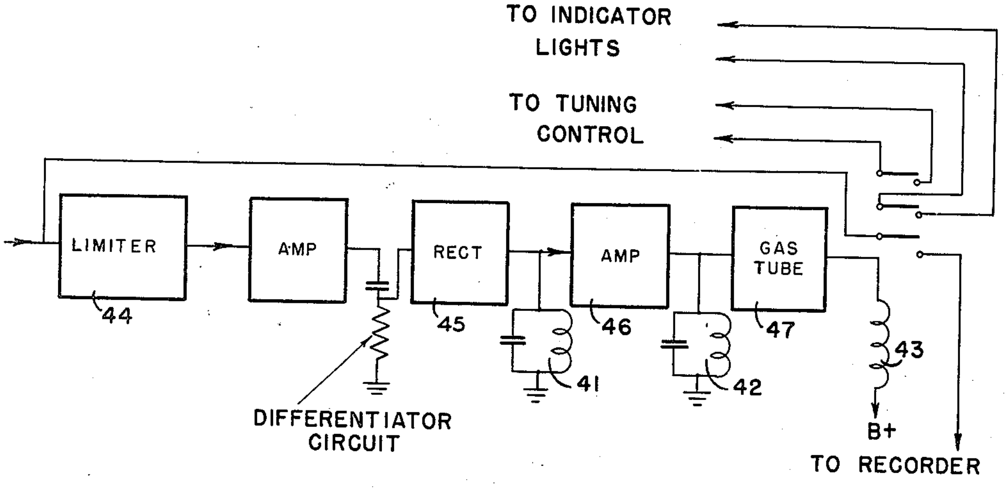
Figure 3 is a block diagram of a recognition device.

One type of recognition device which may be used on the output of the receiving channels operates on the repetition rate of the pulse transmission. Referring to Figure 3, the recognition device consists essentially of two tuned circuits, 41 and 42, in tandem. Each tuned circuit has a fundamental frequency equal to that of the repetition rate of the pulse transmission. The first tuned circuit is made to operate by squaring the wave shape of the input signal in a peak clipper limiter 44. The output of the limiter is differentiated and passed through a rectifier 45 yielding negative pulses which are applied to the tuned circuit 41. The oscillations from this circuit are again amplified and applied to a second tuned circuit 42. In this manner both tuned circuits are shock excited by each received pulse. If the pulse repetition rate is correct, the oscillations of the second tuned circuit will be so related in phase to the exciting potentials as to cause an increase in amplitude of these oscillations to the extent that sufficient voltage will prevail to fire a Thyratron 47. The Thyratron has a fast operating multiple contact relay 43 in its plate circuit. Approximately four to six pulses of the correct repetition rate are necessary to accomplish this operation in the device described. The range of frequency over which the recognition device will respond is determined largely by the Q of the tuned circuits. A Q of approximately 35 will give an operating range about the resonant frequency of about ±10 cycles per second. Undesired signals, which when differentiated, yield pulses greater or less than 250±10 cycles per second will not operate the device. This is due to the fact that the first tuned circuit does not oscillate with sufficient amplitude to excite the second tuned circuit to the required level to fire the Thyratron.

When the recognition device fires on the output of a particular narrow band receiving channel having on it a pulse transmission of the desired type, that particular channel is connected by relay closures to the recording equipment. This recording equipment may take various forms such as a combination camera and oscillograph, magnetic wire recorder, or common audio disc recorder, although the wire recorder is the preferred type. For receiving short transmissions of less than one second duration, the recording equipment can be operated continuously to prevent loss of any portion of the message.

The invention described herein may be manufactured and used by or for the Government for governmental purposes without the payment of any royalty thereon.

What is claimed is:

1. In a receiving system, an input circuit, a filter circuit of wide band width connected thereto, a group of filter circuits of narrow band width connected to said last named circuit, detectors and recognition devices individually connected to each of said filter circuits, said recognition devices comprising a limiter, a rectifier and differentiating device, and a resonant circuit, an output circuit, and means connected to each recognition device for separately controlling the connection of said detectors to said output circuit.

2. In a receiving system; a group of band-pass filters; detectors and recognition devices connected to each of said filters; each of said recognition devices comprising a limiter, a rectifier and differentiating device, and a resonant circuit; an output circuit; and means connected to each of said recognition devices for separately controlling the connection of said detectors to said output circuit.

References Cited in the file of this patent

UNITED STATES PATENTS

| Number | Name | Date |
|---|---|---|
| 1,709,044 | Smythe | Apr. 16, 1929 |
| 1,795,393 | Herman | Mar. 10, 1931 |
| 2,193,843 | Robinson | Mar. 19, 1940 |
| 2,198,901 | Boswau | Apr. 30, 1940 |
| 2,266,668 | Tubbs | Dec. 16, 1941 |
| 2,326,737 | Andrews | Aug. 17, 1943 |
| 2,353,499 | Purlington | July 11, 1944 |
| 2,357,237 | Thompson | Aug. 29, 1944 |
| 2,367,327 | Beers | Jan. 16, 1945 |
| 2,369,662 | Deloraine | Feb. 20, 1945 |
| 2,401,416 | Eaton | June 4, 1946 |
| 2,408,819 | Sorensen | Oct. 8, 1946 |
| 2,409,012 | Bliss | Oct. 8, 1946 |
| 2,415,359 | Loughlin | Feb. 4, 1947 |
| 2,425,315 | Atwood | Aug. 12, 1947 |
| 2,425,316 | Dow | Aug. 12, 1947 |

FOREIGN PATENTS

| Number | Country | Date |
|---|---|---|
| 509,866 | Great Britain | July 24, 1939 |
| 549,771 | Great Britain | Dec. 7, 1942 |

OTHER REFERENCES

Radio, March 1942, pp. 15 to 18.